United States Patent
Langevin et al.

(10) Patent No.: US 10,009,740 B2
(45) Date of Patent: *Jun. 26, 2018

(54) VISUAL IVR USING CALL REDIRECT

(71) Applicant: AT&T INTELLECTUAL PROPERTY I, L.P., Atlanta, GA (US)

(72) Inventors: Charles Langevin, Killingworth, CT (US); Brian Nab, Allen, TX (US); Eric Reed, Frisco, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/657,631

(22) Filed: Jul. 24, 2017

(65) Prior Publication Data

US 2017/0325080 A1   Nov. 9, 2017

Related U.S. Application Data

(63) Continuation of application No. 14/921,283, filed on Oct. 23, 2015, now Pat. No. 9,730,036, which is a continuation of application No. 13/688,774, filed on Nov. 29, 2012, now Pat. No. 9,191,795.

(51) Int. Cl.
| | |
|---|---|
| H04M 1/64 | (2006.01) |
| H04W 4/16 | (2009.01) |
| H04L 29/08 | (2006.01) |
| H04M 3/493 | (2006.01) |
| H04W 12/06 | (2009.01) |
| H04L 29/06 | (2006.01) |

(52) U.S. Cl.
CPC ............ *H04W 4/16* (2013.01); *H04L 67/02* (2013.01); *H04M 3/493* (2013.01); *H04W 12/06* (2013.01); *H04L 63/0861* (2013.01)

(58) Field of Classification Search
CPC ............ G06F 3/0482; H04M 1/72519; H04M 2250/56; H04M 3/5166; H04M 7/0039
USPC ........................................... 379/88.01–88.19
See application file for complete search history.

(56) References Cited

U.S. PATENT DOCUMENTS

| | | |
|---|---|---|
| 7,027,990 B2 | 4/2006 | Sussman |
| 7,054,939 B2 | 5/2006 | Koch et al. |
| 7,142,661 B2 | 11/2006 | Erhart et al. |
| 7,813,485 B2 | 10/2010 | Yin et al. |

(Continued)

*Primary Examiner* — Solomon Bezuayehu
(74) *Attorney, Agent, or Firm* — Greenblum & Bernstein, P.L.C.

(57) ABSTRACT

A method enables a portable communication device to redirect a call initiated from the portable communication device and to execute a visual interactive voice response application for interfacing with a user. The method includes screening calls initiated from the portable communication device by a communication application resident on the portable communication device, and redirecting a call initiated from the portable communication device when the screening determines that the call matches predetermined criteria. The method also includes authenticating an account corresponding to the portable communication device that initiated the call by communicating with a service provider communication network, and executing a visual interactive voice response application that visually interacts with the user of the portable communication device upon authentication of the account by the service provider communication network.

20 Claims, 4 Drawing Sheets

(56) References Cited

U.S. PATENT DOCUMENTS

| | | |
|---|---|---|
| 7,908,381 B2 | 3/2011 | Koch et al. |
| 8,155,280 B1 | 4/2012 | Or-Bach et al. |
| 8,160,215 B2 | 4/2012 | Or-Bach et al. |
| 8,223,931 B1 | 7/2012 | Lavian et al. |
| 8,290,126 B2 | 10/2012 | Chatterjee et al. |
| 8,345,838 B2 | 1/2013 | Becker |
| 8,358,753 B2 | 1/2013 | DeLuca |
| 8,688,072 B1 | 4/2014 | Agarwal et al. |
| 8,880,120 B1 | 11/2014 | Lavian et al. |
| 2003/0133548 A1* | 7/2003 | Lee .................. H04M 3/493 379/93.17 |
| 2005/0163104 A1 | 7/2005 | Christensen et al. |
| 2006/0079237 A1 | 4/2006 | Liu et al. |
| 2007/0135101 A1 | 6/2007 | Ramati et al. |
| 2008/0085731 A1 | 4/2008 | Davidson et al. |
| 2008/0095330 A1 | 4/2008 | Jin et al. |
| 2008/0232564 A1* | 9/2008 | Gupta ............... H04M 3/42195 379/93.09 |
| 2009/0238355 A1* | 9/2009 | Culeton ............ H04M 3/42153 379/201.12 |
| 2010/0098232 A1* | 4/2010 | Wu ................... H04M 3/42017 379/207.16 |
| 2011/0287748 A1 | 11/2011 | Angel et al. |
| 2012/0257740 A1 | 10/2012 | Kannappan et al. |
| 2012/0300917 A1* | 11/2012 | Commarford ...... H04M 3/4285 379/207.03 |
| 2013/0022191 A1 | 1/2013 | Or-Bach et al. |
| 2013/0094633 A1* | 4/2013 | Mauro ................ G06F 3/0482 379/88.01 |
| 2014/0230032 A1 | 8/2014 | Duncan |
| 2014/0369487 A1 | 12/2014 | Soo |

* cited by examiner

VISUAL IVR USING CALL REDIRECT

CROSS REFERENCE TO RELATED APPLICATIONS

The present application is a continuation of U.S. patent application Ser. No. 14/921,283, filed Oct. 23, 2015, which is a continuation of U.S. patent application Ser. No. 13/688,774, filed on Nov. 29, 2012, now U.S. Pat. No. 9,191,795 issued on Nov. 17, 2015. The disclosure of this document, including the specification, drawings, and claims, is incorporated herein by reference in its entirety.

BACKGROUND

1. Field of the Disclosure

The present disclosure relates to the field of communications. More particularly, the present disclosure relates to the use of call redirect technology for a portable hand-held communication device. The methodology includes provisions for redirecting a call to a caller's service provider initiated from a portable communication device, authenticating the portable communication device, and launching a visual interactive voice response (IVR) application that visually interacts with a user of the portable communication device upon proper authentication of the portable communication device.

2. Background Information

Traditionally, calls made to a caller's service provider for information and/or service are transmitted via a communication network to the service provider. Upon receipt of the call by the service provider, the caller frequently interacts with a traditional audio interactive voice response (IVR) application over the communication network. The traditional audio IVR experience leads the caller through a frequently time-consuming sequence of stages to determine the nature of the caller's inquiry, and to direct the caller to an appropriate automated voice response or customer service representative possessing the specific information desired by the caller.

DETAILED DESCRIPTION

Figure 1:
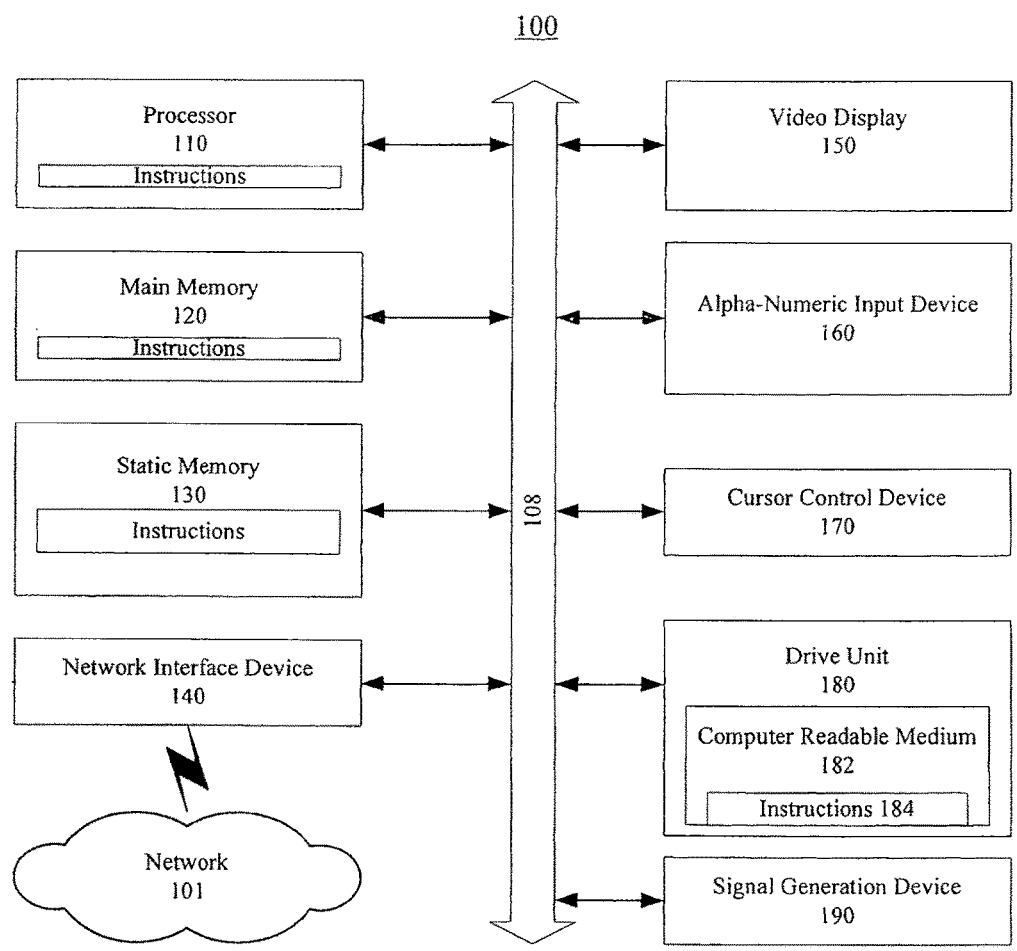
FIG. 1 shows an exemplary general computer system.

In view of the foregoing, the present disclosure, through one or more of its various aspects, embodiments and/or specific features or sub-components, is thus intended to bring out one or more of the advantages as specifically noted below. According to an embodiment of the present disclosure, a method provides for redirecting a call initiated from a portable communication device and subsequently launching a visual IVR application in response to the call. The method includes screening calls initiated from the portable communication device by a communication application, and redirecting a call initiated from the portable communication device when the screening determines that the call meets predetermined criteria. The method also includes authenticating an account corresponding to the portable communication device that initiated the call by communicating with a service provider communication network, and executing a visual IVR application that visually interacts with a user of the portable communication device upon authentication of the account by the service provider communication network.

In another embodiment, the method further includes retrieving personalized account information from the service provider for use by the visual IVR application upon authentication of the account by the service provider communication network.

In a further embodiment, the method includes providing an audio communication and a visual communication to a user of the portable communication device upon completion of the retrieving personalized account information.

In an embodiment, the method further includes terminating the redirecting of the call and forwarding the call via a communication network to an audio IVR system when the authenticating an account fails.

In another embodiment, the method includes simulating a phone call by playing a ring cycle audio file that is audible to a user of the portable communication device during the authenticating an account and the retrieving personalized account information.

In a further embodiment, matching the predetermined criteria includes determining whether the service provider currently providing communication services to the portable communication device matches a designated service provider.

In an embodiment, the retrieved personalized account information from the service provider varies dependent upon a duration of time that an owner of the portable communication device has used the service provider communication network.

In another embodiment, the method further includes displaying an owner homepage that includes selected retrieved personalized account information on a display of the portable communication device.

In a further embodiment, the selected retrieved personalized account information includes a current status of owner billing information, a current status of owner communication usage information, and a plurality of visual selectors that enable a user of the portable communication device to select additional visual pages of information and to talk with an agent of the service provider.

In an embodiment, the additional visual pages of information provide visual selectors enabling a user of the portable communication device to talk to a specialized agent of the service provider who possesses specialized knowledge about a specific service provided by the service provider.

In another embodiment, the plurality of visual selectors includes a visual selector that enables an owner of the portable communication device to initiate an enhanced authentication process enabling the owner to access owner information having a higher level of security than the retrieved personalized account information.

In a further embodiment, the plurality of visual selectors that enable a user of the portable communication device to select additional visual pages of information and to talk with the agent of the service provider may be activated by the user touching the display of the portable communication device.

In an embodiment, the plurality of visual selectors that enable a user of the portable communication device to select additional visual pages of information and to talk with the agent of the service provider may be activated by the user audibly issuing voice commands and/or text commands to the portable communication device, which are received by a receiver in the portable communication device.

In another embodiment, the method further includes identifying a type of the portable communication device, redirecting the call initiated from the portable communication device internally by the portable communication device when the type is identified as a first type of portable communication device, and redirecting the call initiated from the portable communication device externally by the service provider communication network when the type is identified as a second type of portable communication device.

In a further embodiment, designated visual selectors enable the owner to execute special functions, the special functions including managing communication plan services, checking upgrade status, resetting a password, and accessing information determined to be useful to an owner of the portable communication device by the service provider.

In an embodiment, designated visual selectors enable the owner to execute special functions, the special functions including accessing other service accounts that the owner has with the service provider.

In another embodiment, a tangible computer-readable storage medium is encoded with an executable computer program for redirecting a call initiated from a portable communication device, and when executed by a processor, causes the processor to perform designated operations. These designated operations include screening calls initiated from the portable communication device by a communication application, and redirecting a call initiated from the portable communication device when the screening determines that the call matches predetermined criteria. The designated operations also include authenticating an account corresponding to the portable communication device that initiated the call by communicating with a service provider communication network, and executing a visual IVR application that visually interacts with a user of the portable communication device upon authentication of the account by the service provider communication network.

In a further embodiment, the designated operations further include retrieving personalized account information from the service provider for use by the visual IVR application upon authentication of the account by the service provider communication network.

In an embodiment, a portable communication device includes a memory that stores programs and data used by the portable communication device, and a display that displays information to a user of the portable communication device. The portable communication device also includes a processor that screens calls initiated from the portable communication device, redirects a call initiated from the portable communication device when the screening determines that the call matches predetermined criteria, authenticates an account corresponding to the portable communication device that initiated the call by communicating with a service provider communication network, and launches a visual IVR application that visually interacts with a user of the portable communication device upon authentication of the account by the service provider communication network.

In another embodiment, the processor terminates the redirecting of the call, and forwards the call via a communication network to an audio IVR system when the authenticating an account fails.

FIG. 1 is an illustrative embodiment of a general computer system, on which part or all of a process for redirecting calls originating from a portable communication device and executing a visual IVR application that visually interacts with a user of the portable communication device can be implemented, which is designated 100 in FIG. 1. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using, two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a non-transitory computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
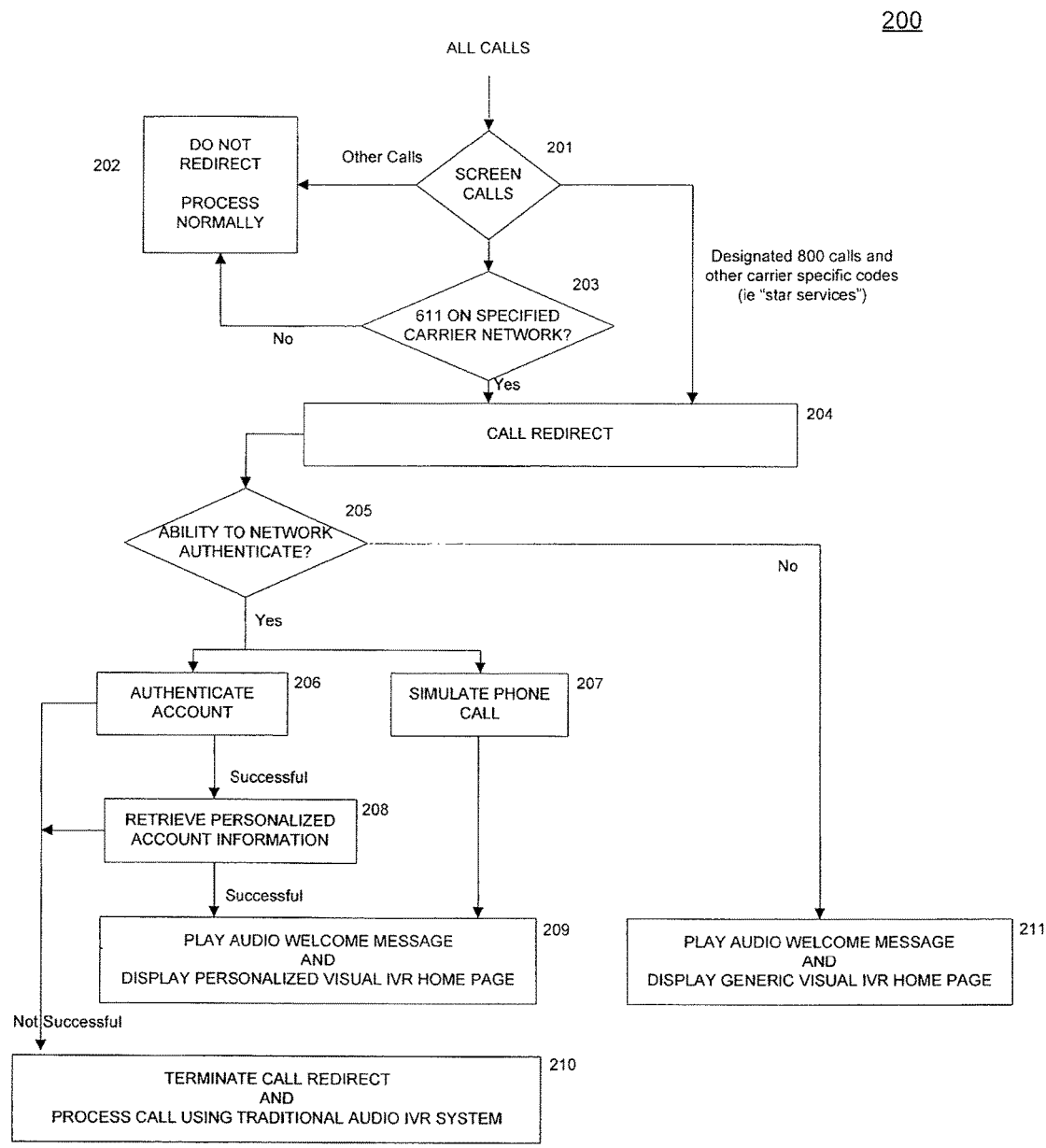
FIG. 2 illustrates an exemplary embodiment of a process for redirecting calls originating from a portable communication device based on a determination that the service provider providing communication services to the portable communication device is the same service provider associated with the visual IVR application.

FIG. 2 shows an illustration of an exemplary embodiment of a process 200 for redirecting calls originating from a portable communication device based on a determination that the service provider providing communication services to the portable communication device is the same service provider associated with the visual IVR application. The visual IVR application may implemented in several ways. For instance, the visual IVR application may be resident in the memory of the portable communication device. Alternatively, the visual IVR application may be located in a service provider server at a location remote from the portable communication device and accessed directly over a network. Another embodiment would include launching the visual IVR application by using an HTML browser using the Internet to interface with a service provider server.

As illustrated in block 201 of FIG. 2, all calls originating from the portable communication device are screened by a communication program. The call screening 201 determines whether the calls match predetermined criteria. The predetermined criteria may include whether a call from the portable communication device is a special 611 call, that is, a user of the portable communication device calls the special number "611". The predetermined criteria may also include whether a call from the portable communication device is a designated 800 call or a service call associated with other service provider specific codes. In this disclosure, designated 800 calls refer to calls made by a user of the portable communication device to a number associated with the service provider of the communication services utilized by the portable communication device. Service calls refer to calls made by a user of the portable communication device utilizing a special format or a specific code, such as special "star services." The special format or code may include calls using special characters, such as a star "*" character, a pound "#" character, some other special character, or a designated combination of special characters. These special characters are utilized in conjunction with other alpha/numeric characters. While only special 611 calls, designated 800 calls, and other carrier specific code service calls are illustrated in the exemplary embodiment of the process illustrated in FIG. 2, any particular call using alpha/numeric characters and/or special characters able to be called by a user of the portable communication device may be designated as being a call needing to be redirected.

The screening calls 201 may also include a determination of whether the particular portable communication device originating a call permits on-device call redirection of not. If the particular portable communication device permits on-device redirection, and meets other established criteria, then the process may proceed to box 203. However, if the particular portable communication device does not permit on-device call redirection, then the call may be forwarded to box 202 and processed in a normal conventional manner.

At the decision box 201, all calls originating from a portable communication device are screened based on predetermined criteria, such as that described above. As illustrated in FIG. 2, designated 800 class and special service calls, such as calls utilizing special service provider specific codes, proceed to box 204 for a determination of whether the call should be redirected. However, special "611" calls proceed to box 203. Special 611 calls originating from a portable communication devices are defined as a short-cut way to contact the service provider providing communication services to the portable communication device. Thus, a user attempting to contact the service provider providing communication services to the portable communication device would not want to have their call redirected to the visual IVR application of a different service provider. However, the user of the portable communication device may have an arrangement with the different service provider for other communication services that are not provided by the service provider that is providing communication services to the portable communication device. Thus, when a user calls a designated 800 number assigned to the other service provider, it would be preferable to have such calls to the other service provider be redirected at 204. This situation occurs when the other service provider is also the same service provider that is associated with the visual IVR application that is resident on the portable communication device.

Thus, at box 203, a determination is made whether the special "611" call was originated from a portable communication device that has communication services provided by the same service provider that is associated with the visual IVR application that is resident on the portable communication device. When it is determined at 203 that the service provider of the portable communication device and the visual IVR application are the same, then the call redirect process proceeds to box 204. However, when it is determined at 203 that the service provider of the portable communication device is different from the service provider associated with the visual IVR application that is resident on the portable communication device, then the "611" call is processed at 202 in a normal convention manner and is not redirected. Thus, the user of the portable communication device is unaware that the call was subjected to a call screening process.

As illustrated in FIG. 2, the actual redirection of calls that may be eligible for call redirection are forwarded to box 204 to begin the next phase of the call redirection process. This next phase begins at 205 where the process determines if the call can be authenticated by the service provider network, based on predetermined criteria associated with the owner of the portable communication device. When a screened call originating from the portable communication device matches predetermined criteria, which may be stored on a service on the next or in a memory of the portable communication device, the call is redirected 205. The predetermined criteria may take one or more of many forms. For instance, the predetermined criteria may relate to include alphanumeric data recognition, voiceprint recognition, audio command recognition, fingerprint recognition, facial recognition, or other visually-related or audio-related information recognition. Additionally, other biometric forms of recognition may also be utilized. Furthermore, the predetermined criteria may include the use of a combination of two or more of the preceding recognition possibilities.

When a determination is made at 205 to authenticate the account of the caller, which is presumably the owner of the portable communication device, two separate events are simultaneously initiated. A first event that is initiated is an initial account authentication 206 of the owner service provider account associated with the portable communication device. This initial authentication is a first level authentication of at least two levels of authentication that are used in an overall composite authentication process. The number of levels of authentication may vary based on the desired levels information security.

While the service provider must provide the necessary capability for multiple levels of authentication, other embodiments of the authentication process enable the owner of the portable communication device to select the number of levels of authentication that are employed by the portable communication device to protect information having different levels of security requirements. A further embodiment would enable the owner of the portable communication device to select which specific information is to be associated with each level of security and corresponding authentication requirement.

With regard to the network authentication at 205, the portable communication device electronically communicates with the service provider over a communications network in order to retrieve the necessary initial authentication. This electronic communication to obtain the necessary initial authentication at 205 is preferably transparent to the user of the portable communication device.

When the initial authentication 205 of the owner service provider account associated with the portable communication device is successfully completed, the process then retrieves predetermined personalized account information 208 of the owner of the portable communication device and stores the predetermined personalized account information of the owner in a memory of the portable communication device. The predetermined personalized account information retrieved during this process 208 corresponds to a first security level.

If, however, either the initial authentication process 206 fails or the attempted retrieval of the personalized account information of the owner 208 fails, the call redirect process is terminated by the portable communication device and the call that had been redirected at 204 is processed in a conventional manner and is forwarded to a traditional audio IVR system at 210. Preferably, the redirection of the call at 204, the attempted authentication of the account at 206, the attempted retrieval of the personalized account information at 208, the termination of the call redirect at 210, and the directing of the call to a traditional audio IVR system are executed in a manner transparent to the user of the portable communication device.

Returning now to the redirection of the call and network authentication 205, the second events of the two separate events that are simultaneously initiated upon the redirection of the call is a simulation of a phone call 207. This simulation of a phone call 207 is implemented by playing a traditional ring cycle audio file that is also stored in the memory of the portable communication device. The simulated phone call is audible to the user of the portable communication device, and serves to alleviate or avoid possible anxiety or an uncomfortability feeling that sometimes arise when a user is provided with no sensory stimulus that the user's call is being processed.

Upon the successful retrieval of the personalized account information at 208, the simulated phone call continues until a confirmation is received by a processor in the portable communication device that the owner's home page will load appropriately. Upon receiving the confirmation that the owner's home page will load appropriately, the simulated phone call 207 ends. At this point, the portable communication device plays an audio welcome message to the user of the portable communication device, and displays the owner's visual IVR home page at 209.

Preferably, the audio welcome message directs the user of the portable communication device to look at the display of the portable communication device when it is safe to do so. This safety reminder is provided to remind the user to complete any activity in which the user is engaged in a safe manner before redirecting the user's eyes from the activity. This reminder is particularly appropriate, for example, to a user who is currently engaging in the driving of an automobile or other activity where harm to the user or another individual may occur if the user's visual attention was abruptly redirected to the display of the portable communication device. However, the user may elect to opt out of utilizing visual displays and utilize an entirely audible interface. In these instances, the user interacts with the system using voice control through a traditional voice IVR system. The overall process at this point transitions from the call redirect portion of the overall process to the visual IVR portion of the process.

In those instances, however, when the network is not able to authenticate the identification of the caller using the predetermined criteria as the owner of the portable communication device at 205, the process proceeds to 211 where an audio welcome message is played and a generic visual IVR home page is played for the caller. While the generic visual home page is similar to the personalized visual IVR home page, the generic visual IVR home page is not caller specific, and does not include any sensitive personal information relating to the owner of the portable communication device. Thus, when the caller is a non-owner of the portable communication device, the caller may still use the portable communication device, subject to having access to any initial security access code that may be needed to unlock the portable communication device.

Figure 3:
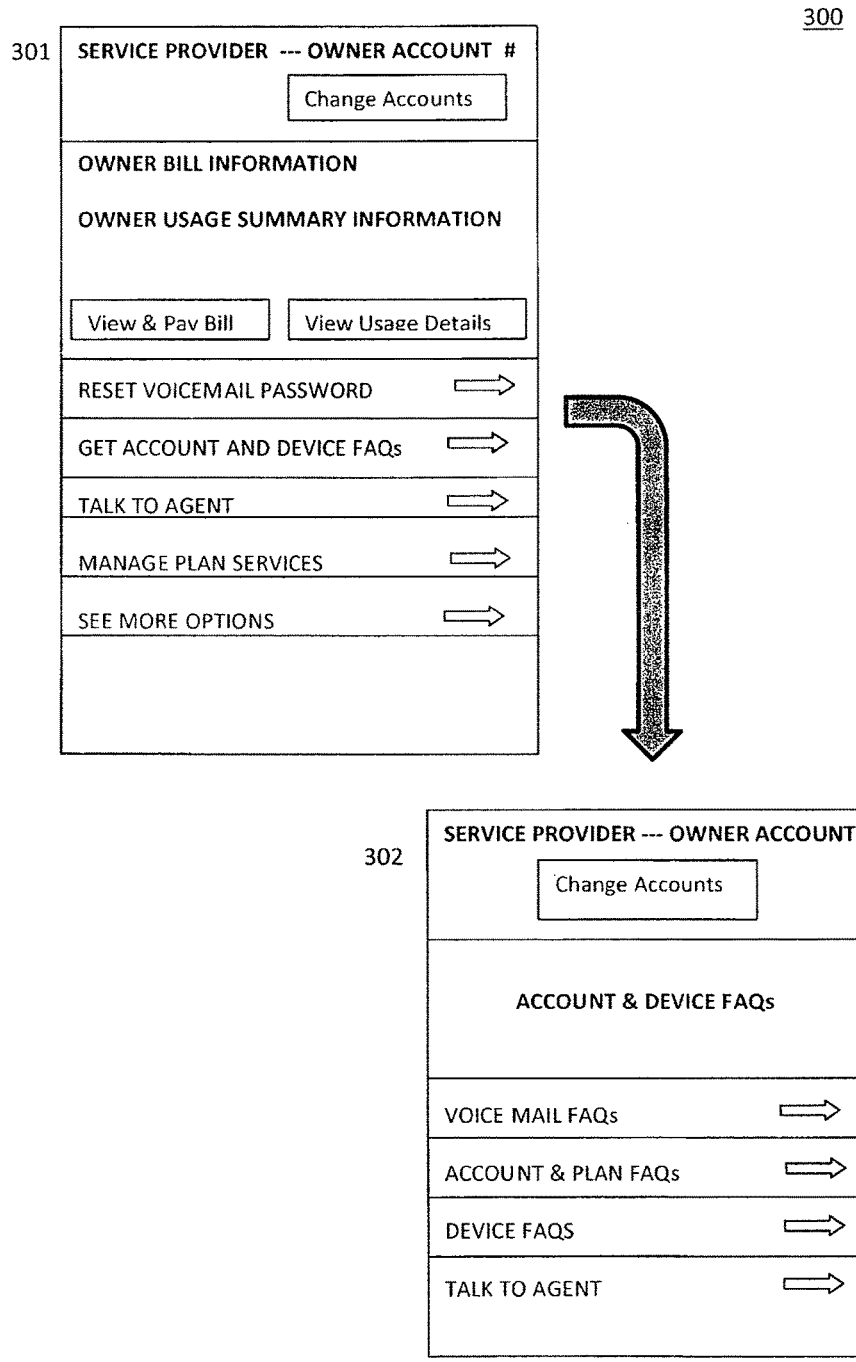
FIG. 3 illustrates an exemplary illustration of an owner visual IVR home page and related additional visual page.

When the caller is presented with either the personalized visual IVR home page or the generic visual IVR home page, the caller is presented with several options. FIG. 3 illustrates a tiered arrangement 300 of an exemplary embodiment of the owner's visual IVR home page 301, and one of many subsequent additional visual pages 302 that may be displayed to the caller dependent upon the selection made by the caller on the visual IVR home page 301. This illustration is exemplary in nature and may be visually configured in many different ways and with as many succeeding visual tiers as necessary. However, the functionality of the owner's visual IVR home page, and the subsequent additional follow-on visual pages, remain consistent in providing an expeditious and user-friendly experience for locating desired information and contacting an agent knowledgeable in the subject matter at issue.

As stated above, in FIG. 3 the overall illustration is identified by 300, which includes both an illustration of an exemplary owner home page 301 and a representative sample of a subsequent additional follow-on visual page 302. The owner home page 301 contains a variety of information as the main entry point into the visual IVR experience. The information generally includes the identification of the service provider that is providing communication services for the portable communication device, and information regarding the owner's account number with the service provider. Such information would normally include current information regarding the owner's bill. Relevant current bill information would include the current balance of the owner's account, the current due date of the next payment, and possibly information relating to the owner having an overdue balance on the owner's account.

Similarly, current information regarding the owner's usage summary during the present billing cycle may be presented. This information would preferably include the minutes available per billing cycle under the owner's present voice call plan, the minutes used during the current billing cycle, and the minutes currently remaining in the current billing cycle. Additionally, when the owner has a data plan, the current information would preferably include the data available per billing cycle under the owner's present data plan, and the data used during the present billing cycle, and the data currently remaining in the current billing cycle. Similarly, when the owner has a text message plan, the current information would preferably include the number of text messages that are available per billing cycle under the owner's present data plan, the number of text message that have been sent during the present billing cycle, and the number of text messages that are currently remaining in the current billing cycle.

Other operational features relating to an owner's billing and usage information would be the provision of visual icons or button, which when activated, will enable the owner to proceed to a subsequent visual page that permits the owner to view and pay the owner' bill. Similarly, another visual icon or button may be activated to view further details regarding the owner's usage of voice, data, and text message allotments.

The owner's visual home page preferably also provides a plurality of visual command prompts, which when activated by either touching an appropriate icon or button on the visual home page or by voice command. Such visual command prompts will generally provide the owner access to a second level of visual information pages. Exemplary visual command prompts for an owner's home page may include prompts for: accessing other accounts that the owner may have with the same service provider, checking the owner's upgrade status, rescuing of the owner's voicemail password, obtaining access to frequently asked questions and related answers regarding the owner's account and/or portable communication device, talking with an agent of the service provider, managing plan services that are available to the owner, as well as a prompt for getting visual access to more visual prompts that have not been included on the owner's visual home page.

As further illustrated in FIG. 3, a plurality of visual prompts permits the owner to access additional follow-on visual displays, generally providing more detailed information regarding the information associated with the main prompt that is being activated. For example, in FIG. 3 when the owner activates the visual prompt entitled "Get Account and Device FAQs" on the owner's visual home page 301, the visual IVR program executes a command to proceed to a second level visual display 302 that is associated with the main first level prompt on the owner's visual home page. In the example illustrated in FIG. 3, the second level visual display provides more detailed information regarding frequently asked questions regarding the owner's account and portable communication device. As illustrated in FIG. 3, the exemplary second level prompts include prompts for: Voice Mail FAQs, Account & Plan FAQs, Device FAQs, and a prompt for Talk to Agent. These second level visual prompts enable the owner to quickly proceed through the visual IVR pages to access the information desired. Additionally, it is preferable that at each visual level, the agent accessible by the "Talk to Agent" prompt becomes more specialized and possessing readily available specialized information regarding the visual prompts included on the visual level being accessed. Furthermore, some visual prompts may be repeated, such as the "Change Accounts" prompts, to enable the user to access this prompt on a variety of visual levels.

The number of visual prompts, the configuration of the visual prompts, and availability of icons or buttons to activate the prompts, for example, are selectably changeable by the service provider. This ability to alter all aspects of the visual IVR permits the service provider to continually human engineer the visual IVR to be responsive to operational changes, to adapt to unexpected situations, and to increase the user-friendliness of the visual IVR based on feedback from users of the visual IVR interface.

As discussed above, there are no set limits as to how many levels of visual displays may be utilized in the visual IVR. The visual IVR begins with the owner visual home page, which generally corresponds to the base of a tree, and continues with each succeeding level of visual pages representing another set of operational tree branches, which becomes more detailed at each succeeding level.

Furthermore, the visual information provided at each visual level may be programmed to change dependent upon one or more various factors. For instance, the visual information presented may change dependent upon the month of the year, the week of the month, the day of the week, and/or the time of the day. The visual information may also change due to the holidays or special events. Additionally, the visual information may change due to the language setting of the portable communication device, or the geographical location of the portable communication device detected by an electronic position locator program included in the portable communication device. The preceding examples are not limiting and may include any number of variations in order to provide the owner of the portable communication device with a most informative and user friendly experience for interacting with the service provider associated with the visual IVR application.

With regard to the prompt relating to the changing of accounts, the other accounts may include any number of accounts relating to the service provider of the visual IVR program. For instance, the other account may include access to account for home or mobile television services, home or mobile phone services, computer services (including desktop, laptop, tablet, personal digital assistant, smart-phone, mi-fi, etc.), and any other wired or wireless services provided by the service provider.

Further prompts that may be included in the visual IVR include prompts for: activating service provider agent call-back functionality, scheduling service provider agent call-back appointments, scheduling in-store service provider agent appointments, virtual-chat functionality, live-chat functionality, ordering/purchasing service-provider-related items for delivery or in-store pick-up, troubleshooting, accessing self-help audio/video modules, accessing self-diagnostic tools, accessing how-to video clips, accessing device operational and physical features tutorials, and accessing technical support. Additionally, a special owner prompt may be included to "bookmark" a special location in the visual IVR program to which the owner would like to return to directly in a short-cut manner without needing to start at the beginning owner visual home page.

Figure 4:
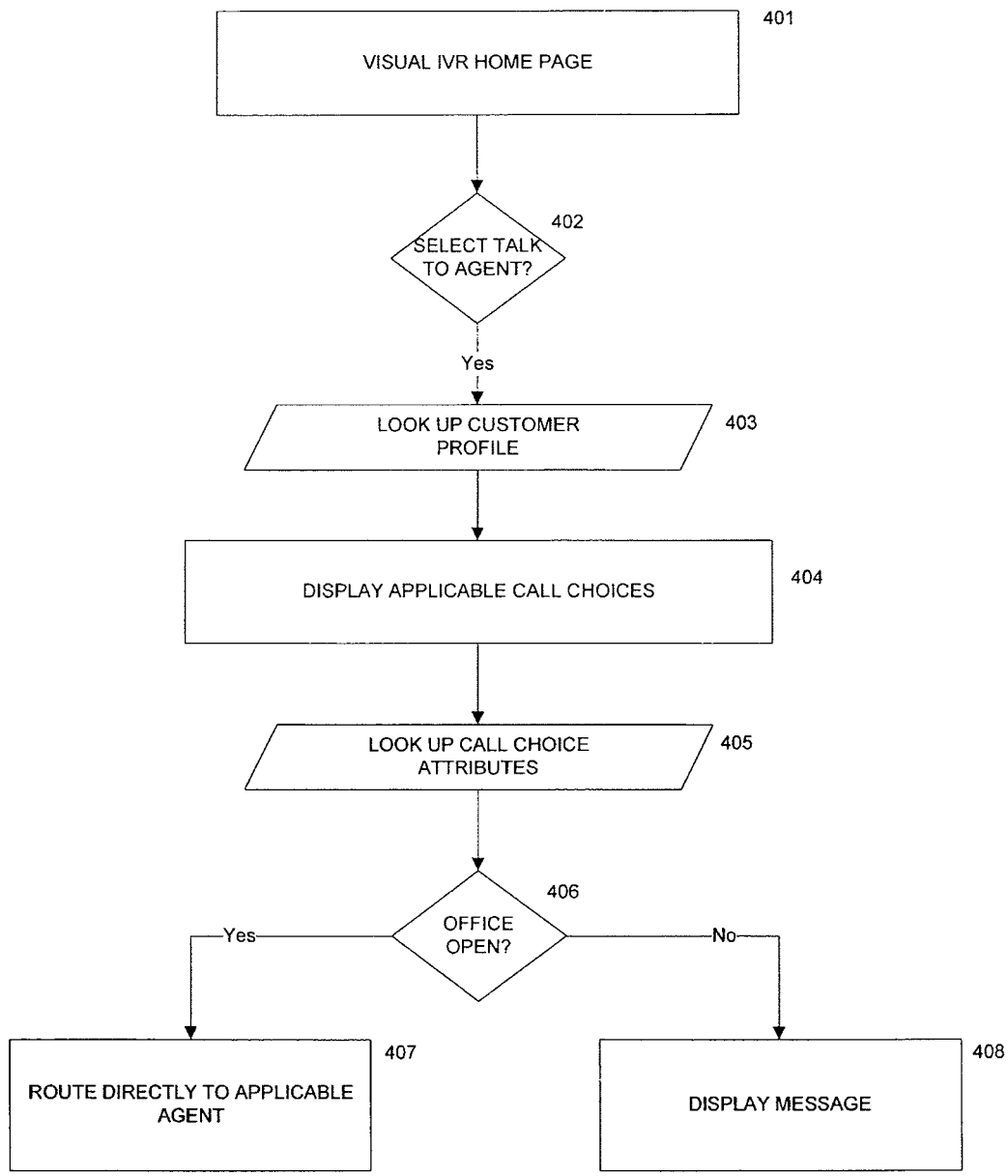
FIG. 4 illustrates an exemplary embodiment of a process initiated when a caller elects to talk with a service provider agent based on a selection made from the visual IVR home page.

FIG. 4 provides an illustration 400 of a process initiated from the visual IVR home page to talk with a service provider agent. The process illustrated in FIG. 4 relates to the personalized visual IVR home page. A similar process is provided to a caller that is not the owner of the personal communication device, however, the visual displays do not provide any personalized information regarding the account of the owner of the portable communication device.

At 401, using the visual home page the caller makes a selection to talk with a service provider agent at 402. This selection may be made by selecting a visual prompt, such as that illustrated in the personalized visual home page 301 illustrated in FIG. 3, by audio command, or by some combination of visual and audio commands. Upon making the selection to talk with a service provider agent, the process retrieves information from a stored customer profile at 402. The stored customer profile would include personalized information associated with the owner of the portable communication device. At 404, the visual IVR program would displays a variety of choices available to the caller. Since the visual IVR program provides an option to talk with a service provider agent at substantially all of the visual displays of the various visual IVR tiers, the choices provided to the caller may vary to be more subject matter specific. Generally speaking, the further the call proceeds through successive visual tiers, the more subject matter specific the choices available become. However, the caller is always provided the option to speak with an agent that has access to any account-related service provider information.

At 405, the visual IVR program retrieves the attributes associated with the call choice made by the caller, and determines is the appropriate service provider office having the requested information is open for business at 406. When the specific service provider office is open, the call is routed directly to an applicable agent to provide service to the caller at 407. However, when the specific service provider office is not open, an informational message is provided to the caller informing the caller when the office is open and/or providing other information that may be of assistance to the caller at 408. This information message may be a visual message, an audio message, or a combination of visual and audio messages. The intent is to provide the caller with an option to talk with a service provider agent from the visual IVR home page, and from each of the various talk of visual displays, so that the caller has a satisfying experience using the visual IVR system and may elect to speak with a service provider agent at any point as they progress through the IVR system tiers.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the method may be implemented using various forms of communication including telephone land lines, cell phones, voice over Internet protocol, and video calls.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for redirecting a call initiated from a portable communication device, the method comprising:
    screening the call initiated from the portable communication device by a communication application resident in the portable communication device;
    automatically redirecting, by the portable communication device, the call from normal call processing, when the screening determines that the call matches predetermined criteria;
    authenticating an account corresponding to the portable communication device that initiated the redirected call by communicating with a service provider communication network; and
    executing a visual IVR application that visually interacts with a user of the portable communication device upon authentication of the account by the service provider communication network,
    wherein the redirected call is forwarded via a communication network to an alternate audio IVR system when the authentication of the account fails.

2. The method as described in claim 1,
    wherein the screening includes using one or more forms of biometric recognition.

3. The method as described in claim 2,
    wherein the one or more forms of biometric recognition includes voiceprint recognition, fingerprint recognition, and/or facial recognition.

4. The method as described in claim 1,
    wherein the screening includes using a combination of a form of alphanumeric recognition and one or more forms of biometric recognition, and
    wherein the one or more forms of biometric recognition includes voiceprint recognition, fingerprint recognition, and/or facial recognition.

5. The method as described in claim 1, further comprising:
    retrieving personalized account information from the service provider for use by the visual IVR application upon authentication of the account by the service provider communication network.

6. The method as described in claim 1, further comprising:
    terminating the redirecting of the call and forwarding the call via a communication network to an audio IVR system when the authenticating an account fails.

7. The method as described in claim 5, further comprising:
    simulating a phone call by playing a ring cycle audio file that is audible to the user of the portable communication device during the authenticating an account and the retrieving personalized account information.

8. The method as described in claim 1,
    wherein matching the predetermined criteria includes determining whether the service provider currently providing communication services to the portable communication device matches a designated service provider.

9. The method as described in claim 5,
    wherein the retrieved personalized account information from the service provider varies dependent upon a duration of time that an owner of the portable communication device has used the service provider communication network.

10. The method as described in claim 5,
    wherein the selected retrieved personalized account information includes a current status of owner billing information, a current status of owner communication usage information, and a plurality of visual selectors that enable the user of the portable communication device to select additional visual pages of information and to talk with an agent of the service provider.

11. The method as described in claim 10,
    wherein the additional visual pages of information provide visual selectors enabling the user of the portable communication device to talk to a specialized agent of the service provider who possesses specialized knowledge about a specific service provided by the service provider.

12. The method as described in claim 10,
    wherein the plurality of visual selectors includes a visual selector that enables an owner of the portable communication device to initiate an enhanced authentication process enabling the owner to access owner information having a higher level of security than the retrieved personalized account information.

13. The method as described in claim 9,
    wherein the plurality of visual selectors that enable the user of the portable communication device to select additional visual pages of information and to talk with the agent of the service provider may be activated by the user audibly issuing voice or text commands to the portable communication device, which are received by a receiver in the portable communication device.

14. The method as described in claim 1, further comprising:
- identifying a type of the portable communication device,
- redirecting the call initiated from the portable communication device internally by the portable communication device when the type is identified as a first type of portable communication device, and
- redirecting the call initiated from the portable communication device externally by the service provider communication network when the type is identified as a second type of portable communication device.

15. A non-transitory computer-readable storage medium encoded with an executable computer program for redirecting a call initiated from a portable communication device, and when executed by a processor, causes the processor to perform operations comprising:
- screening the call initiated from the portable communication device by a communication application resident on the portable communication device;
- automatically redirecting, by the portable communication device, the call when the screening determines that the call matches predetermined criteria;
- authenticating an account corresponding to the portable communication device that initiated the redirected call by communicating with a service provider communication network; and
- executing a visual IVR application that visually interacts with a user of the portable communication device upon authentication of the account by the service provider communication network,
- wherein the redirected call is forwarded via a communication network to an alternate audio IVR system when the authentication of the account fails.

16. The non-transitory computer-readable storage medium according to claim 15,
- wherein the screening includes using a combination of a form of alphanumeric recognition and one or more forms of biometric recognition, and
- wherein the one or more forms of biometric recognition includes voiceprint recognition, fingerprint recognition, and/or facial recognition.

17. A portable communication device, comprising:
- a memory that stores programs and data used by the portable communication device;
- a display that displays information to a user of the portable communication device; and
- a processor that performs operations, including
  - screening a call initiated from the portable communication device by a communication application resident in the portable communication device,
  - automatically redirecting a call initiated from the portable communication device when the screening determines that the call matches predetermined criteria,
  - authenticating an account corresponding to the portable communication device that initiated the redirected call by communicating with a service provider communication network; and
  - executing a visual IVR application that visually interacts with the user of the portable communication device upon authentication of the account by the service provider communication network,
  - wherein the redirected call is forwarded via a communication network to an alternate audio IVR system when the authentication of the account fails.

18. The device as described in claim 17,
- wherein the screens calls includes using one or more forms of biometric recognition.

19. The method as described in claim 18,
- wherein the one or more forms of biometric recognition includes voiceprint recognition, fingerprint recognition, and/or facial recognition.

20. The portable communication device according to claim 17,
- wherein the screens calls includes using a combination of a form of alphanumeric recognition and one or more forms of biometric recognition, and
- wherein the one or more forms of biometric recognition includes voiceprint recognition, fingerprint recognition, and/or facial recognition.

* * * * *